United States Patent Office 3,549,608
Patented Dec. 22, 1970

3,549,608
STEREOSYMMETRIC POLYPROPYLENE
Harry W. Coover, Jr., and Frederick B. Joyner, Kingsport, Tenn., assignors to Eastman Kodak Company, Rochester, N.Y., a corporation of New Jersey
No Drawing. Continuation of application Ser. No. 44,245, July 21, 1960. This application Dec. 5, 1966, Ser. No. 599,669
Int. Cl. C08f 1/56, 3/10
U.S. Cl. 260—93.7                                   6 Claims

ABSTRACT OF THE DISCLOSURE

Solid highly crystalline polypropylene having a limited melting point of at least 180° C., a tensile strength at yield of 5,500 p.s.i. to 7,000 p.s.i. and a stiffness of 180,000 p.s.i. to 240,000 p.s.i.

---

This application is a continuation of Ser. No. 44,245, filed July 21, 1960, and now abandoned, which is a continuation-in-part of our copending application, Ser. No. 754,708, filed May 23, 1958, and now abandoned, which is a continuation-in-part of our copending application Ser. No. 724,909, filed Mar. 31, 1958, now Pat. No. 2,969,345.

This invention relates to a novel and more versatile solid highly crystalline polymer of propylene. In a specific aspect this invention relates to a novel and more versatile solid highly crystalline polymer of propylene having specific properties not attained by propylene polymers produced heretofore. In another aspect this invention relates to formed articles, films and fibers prepared from said novel, solid highly crystalline polymer of propylene.

It has become well recognized in the polyolefin field that it is possible to produce polymers having widely differing properties and physical characteristics from the same starting monomeric material. For example, solid polymers of ethylene have been produced for many years in accordance with the procedure described by Fawcett et al. in U.S. 2,153,553. It has also been recognized that, by employing different reaction conditions and/or different catalyst system, other types of polyethylene can be produced. Although the same initial monomer is employed to produce these polymers of ethylene, the resulting products have been found to have rather widely differing properties. The nature of the polymer that is produced is dependent to a considerable extent upon the catalyst system and the process conditions, particularly the temperature and pressure used in the polymerization process.

In the production of polymers of propylene it has also been recognized that rather widely differing products can be produced from the same starting monomer. For example, Natta in Scientific American, September 1957, has described at least three different types of polypropylene. The types of polypropylene have been described by Natta as being dependent upon the arrangement of asymmetric carbon atoms in the carbon chain of the polymer. One of the polymer types has been called "atactic" and it contains side groups of carbon atoms occurring at random on either side of the carbon chain of the polymer. A second type of propylene polymer has been called "isotactic" and it is indicated that the side groups of carbon atoms lie only on one side of the carbon chain in the polymer. The third type of propylene polymer has been called "syndiotactic" and in this type of polymer the side groups of carbon atoms alternate from one side to the other in regular order on the carbon chain of the polymer. A fourth type of polypropylene was described by Natta in La Chimical e l'Industria, April 1957. This type has been called "stereoblock" and is characterized by the presence of successive legnths of chain of different steric configurations in the same macromolecule. Three types of polypropylene have been produced by Natta with a specific type of catalyst and one of the most widely known types of catalyst systems employed by Natta includes the chloride of a metal such as titanium and an organometallic compound such as an aluminum triakyl. The isotatic polypropylene produced by Natta has been recognized to be a crystalline substance which is reported to have a melting point of 346° F. (175° C.).

Another procedure for producing polypropylene has been described in British Pat. 777,538 wherein it is disclosed that propylene can be polymerized to solid polymer in the presence of a compound of a metal such as titanium having a valence of 2. The polypropylene produced in accordance with this process contains only a relatively small amount of solid crystalline polymer, and in general, the crystalline content of the polymer is within the range above 0.5% and below 30%.

A further method of producing polypropylene has been described in U.S. 2,825,721. In this process propylene is polymerized at a temperature up to 500° F. with a catalyst containing chromium oxide and a second metal oxide such as silica, alumina, zirconia or thoria. The polymer produced in accordance with this process has a wide molecular weight range and the total polymer can be separated into three fractions, viz, a liquid fraction, a tacky fraction and a solid fraction containing polymeric material at the upper end of the molecular weight range. The solid fraction of the polymer has a melting point within the range of 240 to 300° F. and only 10 to 27% of the polypropylene is in the solid form. Also, only 5 to 10% of the polypropylene has been found to be soluable in a solvent such as methylisobutyl ketone at a temperature of 200° F.

It is an object of this invention to provide a new and improved type of solid highly crystalline polymer of propylene. It is another object of this invention to provide a new solid polymer of propylene having significantly improved specific properties when compared with the various types of propylene polymers produced prior to this invention. It is a further object of this invention to provide formed articles, films, fibers, etc. prepared from the novel and highly crystalline propylene polymer of this invention. It is a further object of this invention to provide a specific type of propylene polymer having properties and uses not attainable by the polypropylene produced heretofore. Further and additional objects of this invention will be quite apparent from the detailed description appearing hereinbelow.

In accordance with this invention it has been found that a new and more versatile type of highly crystalline solid propylene polymer can be prepared that is significantly different from prior art polypropylene. This new type of propylene polymer has properties that are radically different from the properties of the various types of polypropylene already described in the art. This new propylene polymer is completely insoluble in methylisobutyl ketone and heptane and it has a limiting melting point considerably higher than prior art polypropylenes. It also has a greater hardness, stiffness and tensile strength than the previously known polymers. It is also possible to produce molded articles with this new type of polypropylene that are considerably harder and more transparent than the prior art polypropylenes. It is further possible to produce films with this new propylene polymer having a much improved transparency and the stability of this polymer toward ultraviolet light is substantially better than the various types of prior art polypropylene.

The superior properties of our new propylene polymer have been established by considerable testing and comparison of this new polymer with the prior art types of polypropylene. The superior and remarkable physical properties of this new propylene polymer are the result of a regular or symmetrical structure formed in the carbon chain of the polymer during the polymerization reaction. The carbon chain of the polymer is substantially completely symmetrical in all planes and for that reason we have chosen to call this new type of propylene polymer "stereosymmetric polypropylene." Polymeric propylene having the properties of this new type of propylene polymer as well as its sterically symmetrical structure have not been prepared heretofore and the symmetrical structure of this new type of propylene polymer imparts properties to the polymer that could not be obtained with the prior art polymers. The outstanding superiority of the various specific properties of this propylene polymer are quite apparent from the comparative data appearing hereinbelow.

As we have indicated above, our stereosymmetric propylene polymer is characterized by a stereospecific structure of this new type of propylene polymer imparts prospsesses high crystallinity and outstanding physical properties. The symmetrical structure of this polymer depends upon the configuration and arrangement of the asymmetric carbon atoms present in the molecular chains; that is, upon the steric conformation of the polymeric chains. Different polymeric materials are obtainable from a common monomer as a consequence of stereoisomerism in the constituent monomeric units derived therefrom. These polymeric products, although having similar chemical compositions, are completely different entities. They differ remarkably from one another in terms of physical properties and are distinguishable as a result of possessing different steric structures dependent upon the spatial configuration and arrangement of the asymmetric carbon atoms present in the molecular chains. An asymmetric carbon atom may have either a d (dextro) or l (levo) conformation. In polymers of propylene, for example, the asymmetric carbon atoms in the polymer chains may be arranged in a random order or they may be arranged to given chains having only d atoms or only l atoms. Other possible arrangements provide chains having alternating d and l atoms and chains comprised of alternating sequences or blocks of d and l types. These are illustrated as follows:

lddldlddllldlldd . . . . . . . . . . . . . Random order.
ddddddd . . . or llllllll . . . . . . . All d or all l.
dldldldldldldldl . . . . . . . . . . . . . Alternating d and l.
ddddddllllllldddddllll . . . . . . . . Block arrangement.

It is these differences in the structural features of the polymers of propylene, as well as in other polymers derived from monomeric units exhibiting the phenomenon of stereoisomerism, that accounts for the remarkable differences in the physical properties of these various polymers. Stereoregular arrangements of the asymmetric carbon atoms, such as the pure d, pure l or alternating d and l, give rise to a high order of stereosymmetry. This stereosymmetry is manifested in a high order of physical properties and in the thermodynamic properties of the polymer. The magnitudes of these physical and thermodynamic properties, therefore, constitute the best means of distinguishing between the various kinds of steric structures characteristic of the different polymers in question. Even in the case of simple isomeric organic compounds, the principal distinguishing features are manifested in the comparative physical properties. Methyl methacrylate and ethyl acrylate are completely different materials, yet both are unsaturated esters which give the same chemical analysis and undergo identical chemical reactions. They may, however, be distinguished unequivocally by means of comparative physical properties. Balata and Hevea rubber, having identical chemical compositions, are among the many examples illustrating the existence of different compositions of matter characterized by different steric structures resulting from stereoisomerism; F. W. Stavely et al., Ind. Eng. Chem., 48, 778 (1956); S. E. Horne, Jr. et al., Ind. Eng. Chem., 48, 784 (1956). These materials are completely distinguished by means of comparative physical properties.

Methods for determining the exact stereochemical nature or conformation of the asymmetric atoms in the chains of a given type of propylene polymer do not now exist. X-ray diffraction procedures, although useful in studies of the crystallographic unit cell structure and in estimating the degree of crystallinity, do not provide a means for establishing the steric structures of the polymer molecules or for determining their ultimate crystallizability. X-ray methods cannot be used to determine ultimate crystallizability, because these methods fail to measure the contributions of small and imperfect crystallites. The degree of crystallinity of a polymer has no significance per se as a measure of stereosymmetry in the polymer molecules. The degree of crystallinity of a given polymer varies with the thermal history or with the chemical environment to which the polymer is exposed. We prefer to speak of a polymer as having a given crystallinity in terms of its ultimate crystallizability. We determine this crystallinity or ultimate crystallizability by means of a thermodynamic method which measures the limiting melting point of the polymer. Our stereosymmetric propylene polymer having a limiting melting point of 180° C. or higher has a remarkably high crystallinity (in terms of ultimate crystallizability) of greater than 80%. The limiting melting point of a polymer is determined by a method involving repeated melting and cooling cycles, thus giving rise to a series of progressively increasing solidification and annealing temperatures and resultant increasing fusion points. The limiting melting point is the extrapolated temperature at which the difference between the temperature of fusion and the temperature of annealing reaches zero. This procedure is described by R. Calinet in a thesis presented to the faculty of the University of Paris in 1955 entitled "Phenomenes de Transition Dans les Macropolymers; Transition de Relaxation et Phenomenes de Fusion." The limiting melting point is the melting point of the crystalline regions of the polymer molecules at the point of ultimate crystallizability. Since the crystallizability of the polymer is dependent upon the stereosymmetry of the molecular chains, the configuration of these chains is, therefore, the controlling factor in establishing the magnitude of the limiting melting point. Polymers having the various steric arrangements of the asymmetric carbons as described above have different melting points. For example, poly (1,2-butadiene) having an alternating d and l arrangement shows a melting point of 155° C., whereas poly (1,2-butadiene) having the all-d or all-l arrangement melts at 125° C. Under any given set of conditions, our stereosymmetric propylene polymer shows a higher melting point than any of the polypropylenes described in the prior art. The low limiting melting points of the prior art polypropylenes in comparison with the outstandingly high limiting melting point of our stereosymmetric propylene polymer are manifestations of different steric structures having lower ultimate crystallizabilities. Our highly crystalline polymers of propylene exhibit a limiting melting point above 175° C. On this basis, our stereosymmetric propylene polymer is crystallizable to the extent of at least 80%, whereas, the best prior art polypropylene is crystallizable to the extent of 68%.

Thus, one of the outstanding advantages obtained from stereosymmetric propylene polymer is the substantially higher melting point of the polymer. Our stereosymmetric propylene polymer has a melting point of at least 180° C. Natta has described polypropylene having a melting point of 175° C., but, when using the same testing procedure we employ, the melting point of this prior art polypropylene was found to be 165° C. As a result of this much higher melting point, it is possible to prepare molded objects that will withstand higher temperatures without deformation. For example, electrical cables insulated with this new and more versatile propylene polymer can be used at higher temperatures or with heavier electrical currents without failure of the insulation. The greater stiffness and tensile strength of the new propylene polymer permit the molding of more rigid products having thinner sections but of comparable or even greater strength. Also, the greater toughness of this polymer as evidenced by its improved impact strength is particularly important in molded articles where great durability of the product is required.

A further and outstanding unique advantage of the stereosymmetric propylene polymer is its greater stability to heat and ultraviolet light. The outstanding thermal stability of this polymer is demonstrated by the fact that upon extrusion at 475° F. only a very slight, if any, breakdown of molecular weight as measured by inherent viscosity is realized. On the other hand, with prior art types of polypropylene a considerable reduction in molecular weight results from the extrusion of polypropylene in a similar manner. This improvement in thermal stability is extremely important in molding applications since the breakdown of molecular weight during fabrication at elevated temperatures results in a product having inferior physical properties. A similar breakdown in the physical properties of prior art polypropylene results from its exposure to ultraviolet light which causes molded objects to become brittle after only a relatively short exposure under conditions comparable to outdoor weathering. However, our stereosymmetric propylene polymer shows a greatly superior resistance to weathering. This improved property makes it possible to use the stereosymmetric propylene polymer in outdoor applications such as signs, electrical cables, greenhouse windows, etc., where the prior art types of polypropylene are quite impractical because of rapid deterioration under normal weathering conditions.

The improved film transparency of the stereosymmetric propylene polymer permits the use of this polymer in such applications as photographic film where optical clarity is essential. The prior art types of polypropylene have not been satisfactory for this use because of their lack of adequate transparency. On the other hand, the stereosymmetric propylene polymer has been found to possess the necessary transparency and clarity for use in photographic film. For use in photographic film the stereosymmetric propylene polymer can be extruded in a tubular film form having a diameter of about 2–3″ as it issues from the extruder nozzle. The tubular film can then be stretched and oriented in all directions by known blowing techniques which result in expanding of the tubular film to a greater diameter, for example, 2–8 times the original diameter. This multilateral drafting process permits the realization of the maximum physical properties inherent in the film. Alternatively, the maximum physical properties can be attained by biaxially orienting the film at an elevated temperature, e.g. 80 to 150° C. The stretching can be accomplished in two stages, i.e. laterally and longitudinally in either order or simultaneously. During the biaxial orientation the film is reduced in thickness by about ½ to ⅛ or more and its area is increased 2–8 times or more. The oriented film is then oxidized to provide a surface on which the colloid subbing layer will adhere. This oxidation can be accomplished by flaming or by treating the film with an oxidizing solution such as aqueous potassium dichromate. The subbing layer is then applied and application of the photographic emulsion layer follows. These layers can be deposited on the film base by any of the conventional methods used in the manufacture of photographic film, e.g. by immersion of the surfaces of the film into a solution of the coating material, by beading or spraying, or by coating the film from a hopper provided with a doctor blade. Photographic film prepared from the stereosymmetric propylene polymer possesses properties not attainable with prior art types of polypropylene.

As a consequence of its outstanding properties, the stereosymmetric propylene polymer can also be used in the manufacture of magnetic tape. In this use the novel polymer of propylene in a film or strip form provides the base upon which finely-divided magnetic oxide, e.g. ferric oxide, is dispersed. This new magnetic tape is adaptable to the various uses of the older types of magnetic tape.

The formation of the prior art types of solid crystalline polypropylene has been accompanied by the concomitant formation of large amounts of oils as well as rubbery, amorphous materials. The difference in properties between the oils, rubbers and crystalline solids has been explained in terms of the structural arrangement of the propylene units in the polymer chain. The polymers having the most regular structure are able to fit together more completely and therefore they are crystallizable to a greater extent than those polymers that are less regular in structure. The type of polypropylene having a regular structure has been defined in the prior art as the isotactic type of polymer. The regularity of the structure has a considerable effect upon the melting point of the polymer as well as upon its other physical properties. The oily polymers being fluids have no stiffness, hardness or tensile strength and the rubbery or amorphous types of propylene polymers have a very low stiffness, hardness and tensile strength. Consequently, the presence of these oils and rubbery amorphous polymers in polypropylene is highly undesirable when polymers having a high stiffness, hardness and tensile strength are to be used. Although these oils and rubbers are present in the prior art types of polypropylene, they can be extracted from the more crystalline polypropylene by suitable extraction methods. However, the crystalline polyproylene that remains after extraction is highly inferior in its various physical properties to our stereosymmetric propylene polymer. It is of considerable significance that in accordance with out invention it is possible to produce a polymer that is completely stereosymmetric and contains substantially no oils or rubbery polymers. A product of this type requires no extractive procedures to isolate the stereosymmetric polymer and the polymer that is produced has greatly superior properties when compared with the prior art types of polypropylene either in an extracted form or even in an unextracted form containing oils and rubbers. It is a further advantage of this invention that depending upon the reaction conditions and specific catalyst combinations employed in the polymerization reaction a product containing from 80% up to 100% by weight of the stereosymmetric propylene polymer can be produced. The remainder of the product is polypropylene of an oily or rubbery amorphous type. The polymeric products containing 80% and higher stereosymmetric polypropylene have significantly better properties when compared with either extracted or unextracted crystalline polypropylene prepared according to prior art methods.

It should be pointed out that by using catalysts which lead to the stereosymmetric propylene polymer, no products are produced containing more than 20% by weight of heptane-extractable material. Catalysts which produce more than 20% by weight of heptane-extractable material do not afford our stereosymmetric propylene polymer.

The stereosymmetric propylene polymer of this invention can be prepared by a polymerization procedure wherein a novel type of polymerization catalyst is employed. The catalyst can be a mixture containing an alkyl aluminum dihalide having the formula $R_1AlX_2$ wherein $R_1$ is a hydrocarbon radical containing 1 to 12 carbon atoms, for example methyl, ethyl, propyl, butyl, phenyl, phenylethyl, naphthyl and the like, the halogen being chlorine, bromine or iodine, a halide of a transition metal selected from the group consisting of titanium, zirconium, vanadium, chromium and molybdenum, the halide being a chloride, bromide or iodide, and an organophosphorus compound selected from the group consisting of trialkyl phosphites, trialkyl phosphates and trialkyl phosphoramides, the alkyl radicals containing from 1 to 8 carbon atoms. One of the catalyst mixtures that can be used is prepared by mixing an alkyl aluminum dihalide such as ethyl aluminum dichloride, a hexaalkyl phosphoric triamide such as hexamethyl phosphoric triamide and a titanium halide such as titanium trichloride or titanium tetrachloride. Alternatively the catalyst mixture can be composed of an alkyl aluminum dihalide such as ethyl aluminum dichloride, triethyl phosphite and a titanium halide such as titanium tetrachloride or titanium trichloride. The preferred molar ratio of aluminum compound to titanium compound can be varied in the catalyst mixture within the range of 1:0.5 to 1:2 and the molar ratio of aluminum compound to the third component of the catalytic mixture can be varied within the range of 1:1 to 1:0.25. However, it will be understood that higher and lower molar ratios of the various components of the catalytic mixture can be employed to produce the stereosymmetric propylene polymer. The polymerization reaction is usually conducted at a temperature within the range of 50–150° C. but temperatures as low as 0° C. or as high as 250° C. can be employed if desired. The process can be readily controlled at room temperature or higher which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with propylene whereby additional propylene dissolves in the reaction vehicle as the polymerization progresses.

The polymerization reaction can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the propylene being polymerized. The amount of vehicle employed can be varied over rather wide limits with relation to the propylene and catalyst mixture. Best results are obtained using a concentration of catalyst of from about 0.1% to about 2% by weight based on the weight of the vehicle. The concentration of the propylene in the vehicle will vary rather widely depending upon the reaction conditions and will usually range from about 2 to 50% by weight or preferably from about 2 to about 10% by weight based on the weight of the vehicle. Concentrations of propylene in the vehicle of about 3–7% by weight are commonly employed. Higher concentrations of propylene ordinarily increase the rate of polymerization, but concentrations above 5–10% by weight are ordinarily less desirable because the polymer dissolved in the reaction medium results in a very viscous solution.

The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture or paraffins which are liquid at the reaction temperature, or an aromatic hydrocarbon such as benezene, toluene, xylene, or the like, or a halogenated aromatic compound such as chlorobenzene, chloronaphthalene, or orthadichlorobenzene. The nature of the vehicle is subject to considerable variation, although the vehicle employed should be liquid under the conditions of reaction and relatively inert. The hydrocarbon liquids are desirably employed. Other solvents which can be used include ethyl benezene, isopropyl benzene, ethyl toluene, n-propyl benzene, diethyl benzenes, mono and dialkyl naphthalenes, n-octane, isooctane, methyl cyclohexane and any of the other well-known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymer in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The stereosymmetric propylene polymer of this invention can be prepared in accordance with the following example:

EXAMPLE 1

A clean, dry, 280 ml. stainless steel autoclave was placed in a nitrogen-filled dry box and loaded with 1 g. of catalyst and 50 ml. of dry heptane. The catalyst had been prepared previously by slowly mixing 1.0 mole of ethyl aluminum dichloride with 0.5 mole of hexamethyl phosphoric triamide, allowing the heat of the reaction to subside and then adding 1.0 mole of titanium trichloride.

The autoclave containing 1 g. of catalyst and 50 ml. of dry heptane under a nitrogen atmosphere was capped and transferred to a rocker. A 100 ml. charge (51.5 g.) of liquid propylene was added. The autoclave and contents were heated at 85° C. for four hours. The solid product was washed with dry methanol and with water and dried. The conversion was essentially quantitative, 50.6 g. This solid product had an inherent viscosity of 2.7, and contained no heptane extractables. This polymer showed a limiting melting point of 183° C. The crystallinity of this polymer based on the limiting melting point was greater than 80%.

The properties of the stereosymmetric propylene polymer prepared in Example 1 was compared with the properties of prior art polypropylene. The prior art polypropylene was prepared in accordance with the following example:

EXAMPLE 2

In a nitrogen-filled dry box, a total of 1.0 g. of catalyst, consisting of a mixture of triethylaluminum and titanium trichloride in a 1:1 molar ratio and 50 ml. of dry heptane were placed in a 280 ml. stainless steel autoclave. The autoclave was capped, removed from the dry box, and 100 ml. (51.5 g.) of liquid propylene was added to it from a blow case. The autoclave was placed in a rocker and was heated to 85° C. It was maintained under these conditions for 4 hours. The polypropylene obtained in this manner was washed with dry methanol, then with water to remove the catalyst residues. The yield was 50.2 g. of polypropylene. This polymer was extracted 3 times with heptane at 70–75° C. The residual polymer weighed 42.7 g., had an inherent viscosity of 2.7. This residual polypropylene showed a limiting melting point of 165° C., corresponding to a crystallinity of 65–68%. Concentration of heptane extract and dilution with alcohol yielded 7.1 g. of a rubbery, amorphous polypropylene.

A comparison of the physical properties of the prior art polypropylene with our stereosymmetric propylene polymer is contained in the following table.

PHYSICAL PROPERTIES OF POLYPROPYLENE

| | Literature [1] values for prior art polypropylene | Prior art polypropylene | Stereosymmetric polypropylene |
|---|---|---|---|
| Melting point, °C | 165–171 | 165 | 183 |
| Tensile strength, at yield, p.s.i | 4,100–5,700 | 4,390 | 5,500–6,500 |
| Stiffness, p.s.i | 117–143,000 | 140,000 | 180,000–220,000 |
| Impact strength, Izod, at −40° C., ft. pounds per in. of notch | | 0.25 | 0.57 |
| Film transparency, in | | 32 | >200 |
| Thermal stability, drop in inherent viscosity upon extrusion at 475° F | | [2] | [3] |
| Stability toward ultraviolet light, exposure time, hr. to brittleness for 5 mil. film exposed in Weatherometer | | <20 | >40 |

[1] Angewandte Chemie 68, 393 (1956) and Chemistry and Industry 47, 1520 (1957).
[2] 2.7, original i.v. 1.1, final i.v.
[3] 2.7, original i.v. 2.6, final i.v.

From the above table it is quite evident that the stereosymmetric propylene polymer possesses physical properties that are significantly higher than similar physical properties of the prior art polypropylene. For example, the stereosymmetric propylene polymer has a melting point of at least 180° C. which is substantially higher than isotactic polypropylene prepared by prior art methods. Also stereosymmetric propylene polymer has a tensile strength at yield of at least 5500 p.s.i. and a stiffness of at least 180,000 p.s.i. Stereosymmetric propylene polymer undergoes very little, if any, thermal degradation upon extrusion at 475° C. and our polymer of propylene possesses much higher impact strength, film transparency and stability toward ultraviolet light than extracted isotactic polypropylene prepared by prior art procedures.

The limiting melting point of the stereosymmetric propylene polymer within the scope of our invention is within the range of 180° C. to 186° C., the tensile strength at yield is within the range of 5500 to 7000 p.s.i.; and the stiffness is within the range of 180,000 to 240,000 p.s.i.

Under certain conditions using the catalytic mixtures described above, it is possible to prepare stereosymmetric propylene polymer with the polymeric product containing 80% and higher stereosymmetric polymer and up to 20% by weight of heptane-soluble types of polypropylene. This latter type of polymer can be removed from the desired stereosymmetric propylene polymer by extraction with heptane or other similar hydrocarbon solvents, In order to demonstrate further the improvements we have made in propylene polymers a comparison has been made of a product containing 80% stereosymmetric propylene polymer with the unextracted polypropylene prepared in accordance with the procedure described in Example 2 above. The properties of the product containing 80% stereosymmetric propylene polymer are also to be compared with the properties of extracted and purified prior art polypropylene as shown in the table in Example 2. The procedure for preparing the product containing 80% stereosymmetric propylene polymer is shown by the following example.

EXAMPLE 3

The procedure of Example 1 was followed with the exception that a smaller amount of hexamethyl phosphoric triamide was used in the catalyst. The catalyst was prepared by mixing 1.0 mole of ethyl aluminum dichloride with 0.1 mole of hexamethyl phosphoric triamide and subsequently adding 1.0 mole of titanium trichloride. Then 1.0 g. of this catalyst mixture was used as described in Example 1 to prepare 48.1 g. of polypropylene. The properties of this product are shown in the following table. After three extractions with heptane at 70–75° C. which removed 20% of the product, the residue had properties corresponding to those listed under stereosymmetric polypropylene in the table of Example 2.

The results of the comparison of the two types of polymers of propylene are shown in the following table:

| Physical properties | Prior art polypropylene, unextracted | 80% stereosymmetric polypropylene |
|---|---|---|
| Melting Point, °C | 161 | 177 |
| Tensile strength, at yield, p.s.i | 3,740 | 5,115 |
| Stiffness, p.s.i | 117,440 | 145,000 |
| Impact strength, Izod, at −40° C., ft. pounds per in. of notch | 0.29 | 0.57 |
| Film transparency, in | 25 | >150 |
| Thermal stability, drop in inherent viscosity upon extrusion at 475° F | [1] | [2] |
| Stability toward ultraviolet light, exposure time, hr. to brittleness for 5 mil film exposed in Weatherometer | 20 | 40 |

[1] 2.4 original i.v. 1.0 final i.v.
[2] 2.9 original i.v. 2.8 final i.v.

It is quite significant to observe that the stereosymmetric propylene polymer is superior in many of its physical properties to extracted prior art types of polypropylene. Similarly, unextracted stereosymmetric propylene polymer containing up to 20% by weight of lower molecular weight propylene polymers is superior in many of its physical properties not only to unextracted but also to extracted and purified prior art types of polypropylene. In view of this outstanding superiority in physical properties, it is possible to employ stereosymmetric propylene polymer in many uses and formulations for which the prior art types of polypropylene could not be employed. The limiting melting point of 177° C. shown by the product containing 80% stereosymmetric propylene polymer is the result of a depression in the limiting melting point of the stereosymmetric propylene polymer present as a consequence of a mixed melting point effect.

Stereosymmetric propylene polymer can also be prepared in accordance with the procedure described in the following example.

EXAMPLE 4

In a nitrogen-filled dry box, a dry 280-ml. stainless steel autoclave was loaded with 0.75 g. of catalyst comprising a 1:1:0.5 molar ratio of triethylaluminum, titanium tetrachloride and triethyl phosphite. The autoclave was capped, removed from the dry box, placed in a rocking device and attached to a source of propylene. A 100 ml. (51 g.) charge of liquid propylene of high purity was added and rocking of the autoclave was initiated. The mixture was heated to 70° C. and was maintained at this temperature for four hours. The raw product was isolated and washed free of catalyst residues by repeated batch extractions with hot isobutyl alcohol. The purified polymer weighing 46 grams was extracted 3 times with hot heptane. The residual polymer weighed 41 grams and had an inherent viscosity of 1.85. The limiting melting point of this propylene polymer was 180° C. corresponding to an ultimate crystallizability of greater than 80%. The conditioned density of this polymer as determined by the gradient tube method was 0.921. This highly crystalline propylene polymer had physical properties essentially identical with those shown for the stereosymmetric propylene polymer of Example 1.

The stereosymmetric propylene polymer can be extruded, mechanically milled, cast or molded as desired. The polymers can be used as a blending agent with the relatively more flexible high pressure polyethylenes to give any desired combination of properties. The polymer can also be blended with antioxidants, stabilizers, plasticizers, fillers, pigments, and the like, or mixed with other polymeric materials, waxes and the like. In general, the polymer embodying this invention can be treated in similar manner to those obtained by other processes.

The stereosymmetric propylene polymer of this invention has a density of 0.91 and higher, and usually the density is within the range of 0.91 to 0.92.

The various physical properties of our stereosymmetric propylene was determined as described herein above by cedures:

Melting point.—The limiting melting point of polypropylene was determined as described hereinabove by the method of Calinet.

Tensile strength at yield.—A.S.T.M. D638–52T using injection-molded specimens at a strain rate of 2 in./min.

Stiffness in flexure.—A.S.T.M. D747–50 using injection-molded specimens annealed at 160° C. and cooled slowly to room temperature.

Izod impact strength at −40° C.—A.S.T.M. D758–48 using injection-molded specimens.

Film transparency.—Maximum distance between a standard eye chart and a 1-mil film of the polymer in question at which the eye chart is just readable through the film.

Thermal stability.—The drop in the inherent viscosity (measured in Tetralin at 145° C.) of the polymer upon extrusion at 475° F.

Ultra-violet (weathering stability).—Exposure time in a Weather-Ometer (expressed in hours) required to produce embrittlement of a 5-mil film of the polymer.

The specimens used in the determinations of tensile yield strength and stiffness were conditioned according to Procedure A whereas the impact specimens were conditioned according to Procedure B of the Methods of Conditioning Plastics and Electrical Insulating Materials for Testing (A.S.T.M. designation: D618–54).

One of the many uses for the stereosymmetric propylene polymer of this invention is in the magnetic tape recording field. This polymer of propylene possesses properties which are highly desirable in this field and which cannot be obtained or duplicated with many other types of polymers. For example, in the magnetic tape recording field high speed transport systems are frequently used and such systems place a great burden on the physical properties of the tapes. The great amount of frictional heat that is developed using conventional tape constructions produces a deteriorating effect upon both the tape and the sensitive parts of the recording machine. The need for reducing wear caused by friction of the tape on various parts of the recording machine has required considerable variation in the design of the machine. Stereosymmetric propylene polymer with its natural lubricating properties produces much less friction when compared with many other types of tapes prepared from other polymers and is highly desirable in this particular use. Tests that have been conducted on magnetic tapes prepared from stereosymmetric propylene polymer have shown that these tapes can be used 2500 or more times without signs of frictional wear on the tape or on the parts of the machine contacted by the tape. These tests have been conducted at tape velocities up to and exceeding 40 inches per second with pressures exerted on the polypropylene surface exceeding 4 p.s.i.

The wearing properties of stereosymmetric propylene polymer, when used in magnetic tapes, are good enough to permit dispersion of the magnetic recording powder in a vehicle of the polymer in such a manner that the magnetic powder surfaces are immediately adjacent to but not in contact with the recording or reproducing heads of the machine. Stereosymmetric propylene polymer is sufficiently hard to prevent the material from flowing and thus allowing the iron oxide magnetic powder to contact and wear the recording or reproducing heads.

In the preparation of magnetic tapes using the stereosymmetric propylene polymer it is possible to use different types of polypropylene as both the base support for the magnetic tape and as the binder for attaching the magnetic powder to the base. In this manner it is possible to use highly compatible materials which weld the magnetic coating to the base support producing a tape which is relatively free of drop-out due to loss of coating adhesion properties. Also since the two materials are relatively similar in physical properties, the effects of heat are quite small in causing distortion of the tape due to frictional expansion.

Stereosymmetric propylene polymer is higher resistant to moisture when used or stored in humid location. The dimensional stability and heat resistance of the polypropylene are also excellent. Furthermore, the relatively low density of the polymer when compared with other polymers presently employed in magnetic tapes is quite outstanding.

We have defined our stereosymmetric propylene polymer in terms of limiting melting point which gives a thermodynamic measure of ultimate crystallizability, and in terms of certain physical properties indicative of the steric symmetry characteristic of our polymer. A comparison between our stereosymmetric propylene polymer and the prior art polypropylenes in these terms has been made. This comparison clearly differentiates our stereosymmetric propylene polymer from the prior art polypropylene as being a completely new and different type of propylene polymer possessing a structural symmetry hitherto unattained.

We claim:

1. As a composition of matter, a substantially linear, methylisobutyl ketone insoluble, homopolymer of propylene substantially free of catalyst residues having a thermal deformation temperature of at least 160° C., a density of 0.91 to 0.92 (A.S.T.M. D1505), a limiting melting point of 180° C. to 186° C. (determined by the method of Calinet), a tensile strength at yield of 5,500 p.s.i. to 7,000 p.s.i. (A.S.T.M. D638–52T using an injection molded specimen at a strain rate of 2 in./min.) and a stiffness of 180,000 p.s.i. to 240,000 p.s.i. (A.S.T.M. D747–50 using injection-molded specimens annealed at 160° C. and cooled slowly to room temperature).

2. A shaped article of the composition of claim 1.

3. A pellicle formed from the composition of claim 1.

4. A photographic film base formed from the composition of claim 1.

5. A magnetic tape having as a base the composition of claim 1, said base having dispersed thereon a finely divided magnetic metal oxide.

6. As a composition of matter, a substantially linear, substantially catalyst residue free homopolymer of propylene containing up to 20% by weight of heptane soluble polymer and at least 80% by weight of solid heptane insoluble polymer, said heptane insoluble polymer being insoluble in methylsiobutyl ketone and having a thermal deformation temperature greater than 160° C., a density of 0.91 to 0.92 (A.S.T.M. D1505), a limiting melting point of 180° C. to 186° C. (determined by the method of Calinet), a tensile strength at yield of 5,500 p.s.i. to 7,000 p.s.i. (A.S.T.M. D638–52T using an injection molded specimen at a strain rate of 2 in./min.) and a stiffness of 180,000 p.s.i. to 240,000 p.s.i. (A.S.T.M. D747–50 using injection molded specimens annealed at 160° C. and cooled slowly to room temperature).

References Cited

UNITED STATES PATENTS

| | | | |
|---|---|---|---|
| 3,121,063 | 2/1964 | Tornquist | 252—429 |
| 3,112,300 | 11/1963 | Natta et al. | 260—93.7 |

FOREIGN PATENTS

| | | | |
|---|---|---|---|
| 660,892 | 4/1963 | Canada | 260—93.7 |

OTHER REFERENCES

D'Alelio: Fundamental Principles of Polymerization, John Wiley & Sons, 1952 (pp.102–3).

JOSEPH L. SCHOFER, Primary Examiner

E. J. SMITH, Assistant Examiner

U.S. Cl. X.R.

96—87; 117—234; 252—429; 264—94, 210

PO-1050
(5/69)

UNITED STATES PATENT OFFICE
CERTIFICATE OF CORRECTION

Patent No. 3,549,608          Dated December 22, 1970

Inventor(s) Harry W. Coover, Jr. and Frederick B. Joyner

It is certified that error appears in the above-identified patent and that said Letters Patent are hereby corrected as shown below:

Column 2, line 34 "soluable" should be ---soluble---.

Column 3, delete line 22 and insert therefor ---ture which is highly symmetrical and consequently pos---.

Column 8, line 16 "orthadichloroben" should be ---orthodichloroben---.

Column 10, the figures in the last line of the table should read --- <20 --- and --- >40 ---.

Column 11, delete lines 32 and 33 and insert therefor ---propylene were determined by the following procedures:--

Column 12, line 34 "higher" should be ---highly---.

Signed and sealed this 18th day of May 1971.

(SEAL)
Attest:

EDWARD M. FLETCHER, JR.
Attesting Officer

WILLIAM E. SCHUYLER,
Commissioner of Paten